M. PERRY.
DEVICE FOR APPLYING INSECTICIDES TO ANIMALS.
APPLICATION FILED JUNE 5, 1917.
1,256,828. Patented Feb. 19, 1918.
2 SHEETS—SHEET 1.
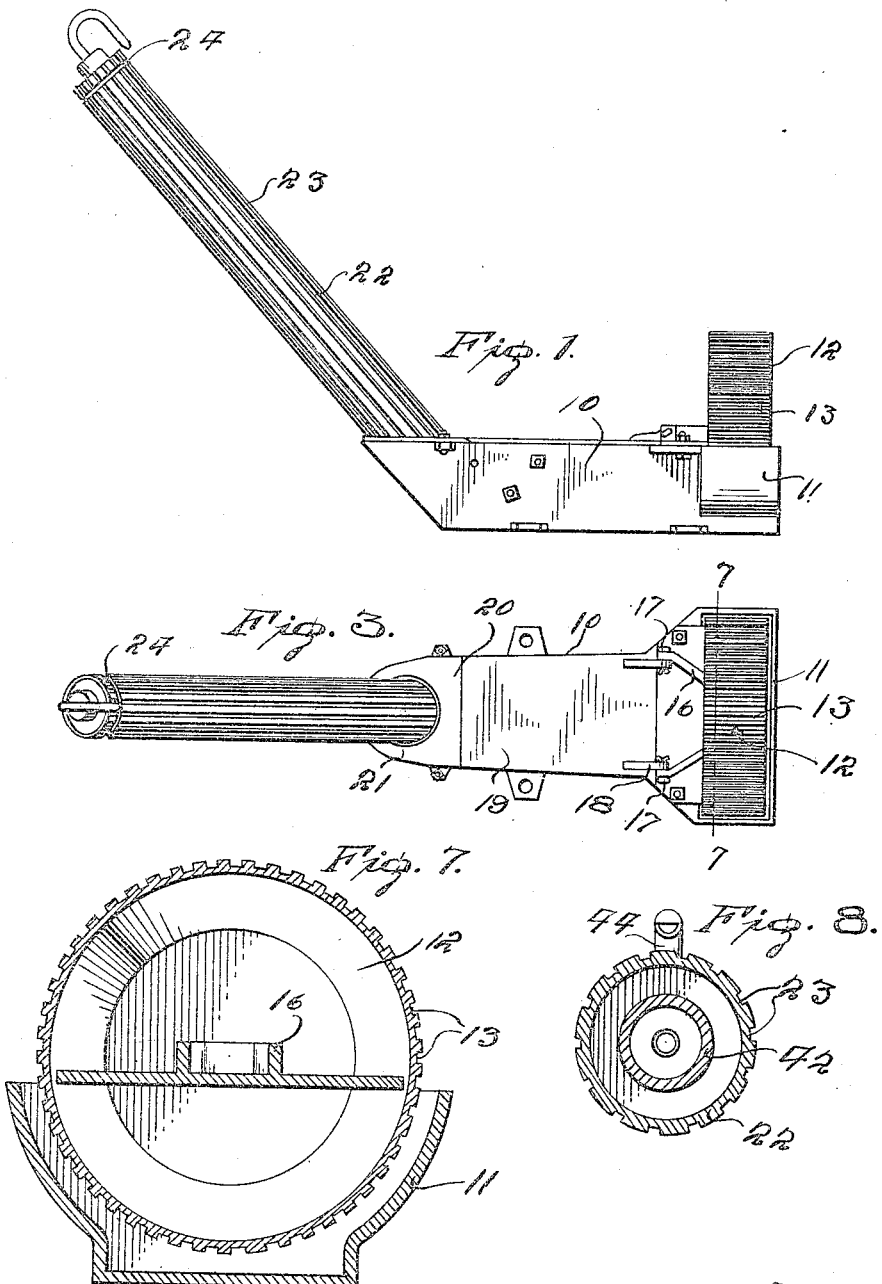

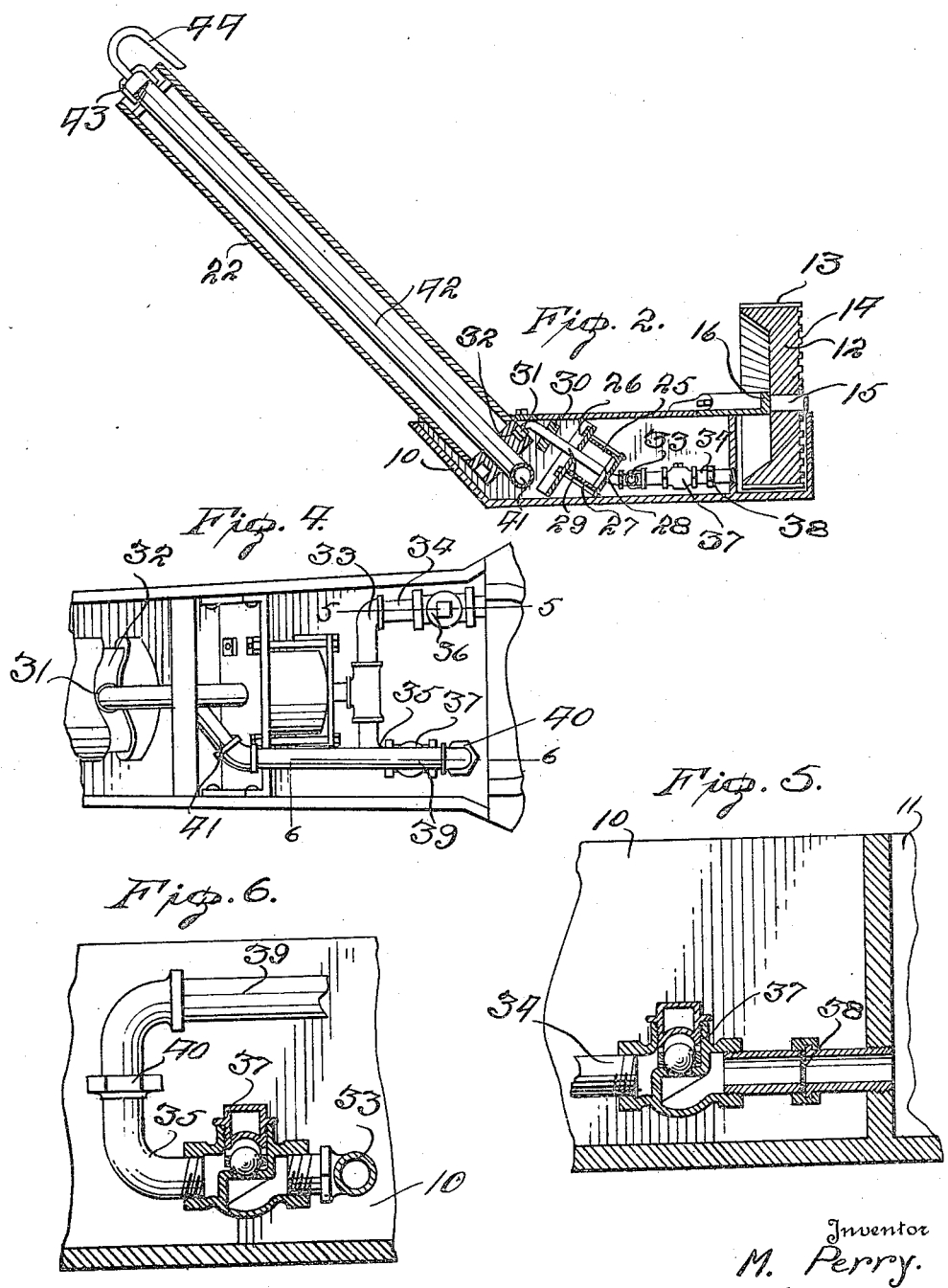

UNITED STATES PATENT OFFICE.

MURLE PERRY, OF WAHPETON, NORTH DAKOTA.

DEVICE FOR APPLYING INSECTICIDES TO ANIMALS.

1,256,828.

Specification of Letters Patent.  Patented Feb. 19, 1918.

Application filed June 5, 1917. Serial No. 173,024.

*To all whom it may concern:*

Be it known that I, MURLE PERRY, a citizen of the United States, residing at Wahpeton, in the county of Richland, State of North Dakota, have invented certain new and useful Improvements in Devices for Applying Insecticides to Animals; and I do hereby declare the following to be a full, clear, and exact description of the invention, such as will enable others skilled in the art to which it appertains to make and use the same.

This invention is an improvement in the care of live stock and has particular reference to a device for applying insecticides to animals.

An object of the invention is to provide an improved mechanism for automatically feeding a liquid insecticide to a distributing member when the latter is moved by contact of an animal therewith.

Another object is to accomplish the effective application of the insecticide to various parts of the body of an animal by providing distributing members of novel construction.

A further object is to provide a device of this character which is simple in construction, easy to manufacture and effective in carrying out the purpose for which it is designed.

The inventive idea involved is capable of receiving a variety of mechanical expressions, one of which, for the purpose of illustrating the invention, is shown in the accompanying drawing, wherein:—

Figure 1 is a side elevation of the device constructed in accordance with the invention.

Fig. 2 is a vertical longitudinal sectional view.

Fig. 3 is a top plan view.

Fig. 4 is a similar view with the cover of the case removed.

Fig. 5 is a section on the line 5—5 of Fig. 4.

Fig. 6 is a section on the line 6—6 of Fig. 4.

Fig. 7 is a section on the line 7—7 of Fig. 3.

Fig. 8 is a transverse section through one of the distributing members.

The drawings illustrate what is now believed to be a preferred form of the invention which comprises a casing or body portion 10 having arranged at one end thereof an insecticide reservoir 11, in which is rotatably mounted one of the distributing members 12 in the form of a roller having the transverse corrugations 13 across its periphery and the concentric corrugations 14 in one of the faces thereof. This member 12 is rotatably supported by means of a stub axle 15 carried by a bearing 16 supported upon the top of the casing 10 and, by fasteners 17 to the lugs or ears 18 formed upon one end of the section 19 of the cover which includes a second section 20 having a circular opening 21 therein for a purpose which will later appear. The sections 19 and 20 of the cover are easily removable so that access may be had to the interior of the casing.

A second distributing member 22 is preferably arranged in an inclined position at one end of the casing 10 and has its lower end extending through the opening 21 in the section 20 and is both slidably and rotatably supported in said casing. This distributing member 22 is preferably in the form of a cylindrical roller having the longitudinal corrugations 23 and a transverse or peripheral corrugation 24 adjacent its upper end, the latter corrugation being adapted to equally distribute an insecticide in the several corrugations 23 when the liquid is discharged from the upper end of the roller in the manner to be presently described. From the description thus far set forth it will be apparent that animals coming in contact with either of the distributing members will rotate the same and thus cause the insecticide to be applied to them.

In the present invention, the rotation and any slight endwise movement of the distributing member 22 is utilized for the purpose of feeding or pumping the insecticide to said distributing member and, to this end, use is made of a pumping cylinder 25 supported within the casing 10 intermediate its ends by a bracket 26 through which the fastening bolts 27 extend and operable in said cylinder is a piston 28 having one end of the piston rod 29 secured thereto, said rod being slidable in a bearing 30 and having mounted upon its other end a roller 31 adapted to engage in a peripheral cam groove 32 formed in the lower end of the distributing member or roller 22 so that when the same rotates or slides in the casing the piston rod 29 will be reciprocated and operate the piston 28 of the pump.

A feed pipe 33 is connected to the pump 25 and is provided with the branches 34 and 35 having the inlet and outlet valves 36 and 37 respectively therein. The branch pipe 34 is connected with the insecticide reservoir 11 and has a strainer 38 therein through which the insecticide passes when the pump 25 is operated. It will be apparent that upon the suction stroke of the piston 28 the valves 36 and 37 will be opened and closed, respectively, thus drawing the liquid from the reservoir 11 into the feed pipe 33 and upon the discharge stroke of said piston said valves will assume opposite positions and the liquid will pass beyond the valve 37 and into the pipe 39 having the coupling 40 connecting said pipe with the branch pipe 35. The pipe 39 extends longitudinally of the casing for a considerable distance and is provided at its other end with a downwardly inclined extension 41 which terminates at a point adjacent the lower or inner end of the distributing member 22. This terminal of the extension 41 has secured thereto a pipe 42 extending longitudinally of the interior of the member 22 and about which said member revolves. The upper end of the pipe 42 is provided with a cap 43 carrying a curved outlet pipe 44 in communication with the pipe 42 so that as the liquid is forced through the latter pipe the same will pass through the outlet pipe 44 and on to the outer corrugated surface of the member 22.

What is claimed is:—

1. In a device for applying an insecticide to animals, the combination of a casing having a reservoir at one end, a corrugated distributing roller having one end rotatably and slidably mounted in the other end of said casing and provided in said end with a cam groove, a pump mounted interiorly of said casing and including a piston rod, a roller carried by said piston rod and engaging in said groove whereby said pump is operated when said distributing roller is actuated, a feed pipe connected to said pump and to said reservoir, and connections between said feed pipe and said distributing roller whereby the insecticide is fed from said reservoir to the outer surface of said distributing roller.

2. In a device for applying an insecticide to animals, the combination of a casing having a reservoir at one end, a corrugated distributing roller having one end rotatably and slidably mounted in the other end of said casing and provided in said end with a cam groove, a pump mounted interiorly of said casing and including a piston rod, a roller carried by said piston rod and engaging in said groove whereby said pump is operated when said distributing roller is actuated, a feed pipe connected to said pump and to said reservoir, connections between said feed pipe and said distributing roller whereby the insecticide is fed from said reservoir to the outer surface of said distributing roller, and a second distributing roller rotatably mounted in said reservoir and having its outer periphery corrugated.

3. In a device for applying an insecticide to animals, the combination of a casing having a reservoir at one end, a corrugated distributing roller having one end rotatably and slidably mounted in the other end of said casing and provided in said end with a cam groove, a pump mounted interiorly of said casing and including a piston rod, a roller carried by said piston rod and engaging in said groove whereby said pump is operated when said distributing roller is actuated, a feed pipe connected to said pump and to said reservoir, a pipe extending interiorly of said distributing roller, an outlet pipe connected to the last named pipe and having its discharge end arranged contiguous to the outer surface of said distributing roller, and connections between said feed pipe and the pipe extending longitudinally of said roller for feeding an insecticide from said feed pipe into the last named pipe.

4. In a device for applying an insecticide to animals, the combination of a casing having an insecticide reservoir, a distributing member rotatably and slidably mounted in said casing, and means operated by the rotation and sliding of said distributing member for feeding an insecticide from said reservoir to said distributing member.

5. In a device for applying an insecticide to animals, the combination of a casing having an insecticide reservoir, a distributing member rotatably and slidably mounted in said casing, and a pump operated by the rotation and sliding of said distributing member for feeding an insecticide from said reservoir to said distributing member.

6. In a device for applying an insecticide to animals, the combination of a casing having a reservoir at one end, a distributing roller rotatably and slidably mounted in the other end of said casing, a pump mounted in said casing and including a piston rod, means carried by said piston rod and engaging said roller whereby said pump is operated when said roller is actuated, and means connected to said pump and reservoir for feeding an insecticide from the latter to said roller.

In testimony whereof, I affix my signature in the presence of two witnesses.

MURLE PERRY.

Witnesses:
W. E. PURCELL,
EDITH RYAN.